Oct. 24, 1939.  C. E. CARPENTER  2,176,989
DOUGH-BATCH CUTTER
Filed April 1, 1938  3 Sheets-Sheet 1
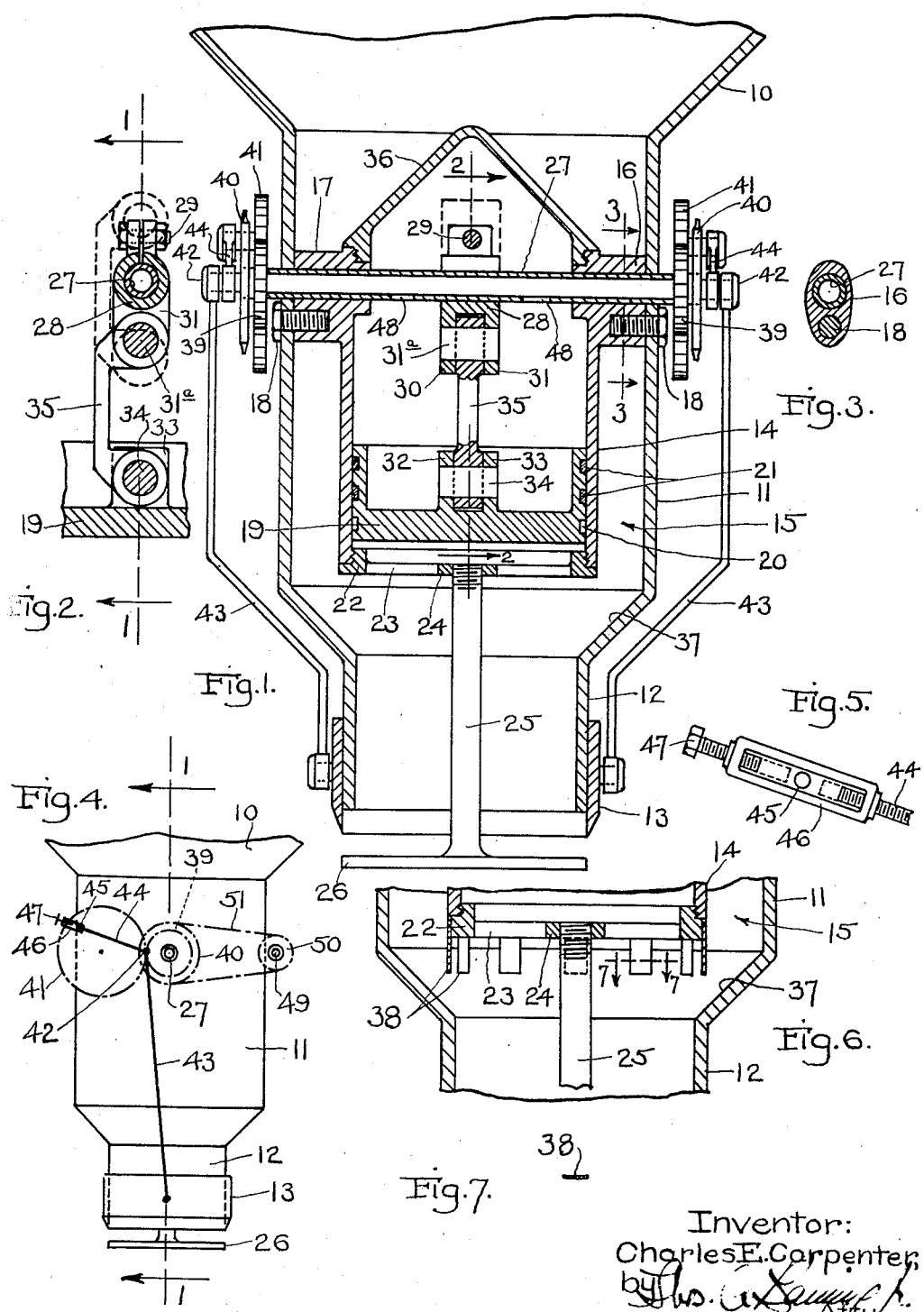
Inventor:
Charles E. Carpenter,
by
Atty.

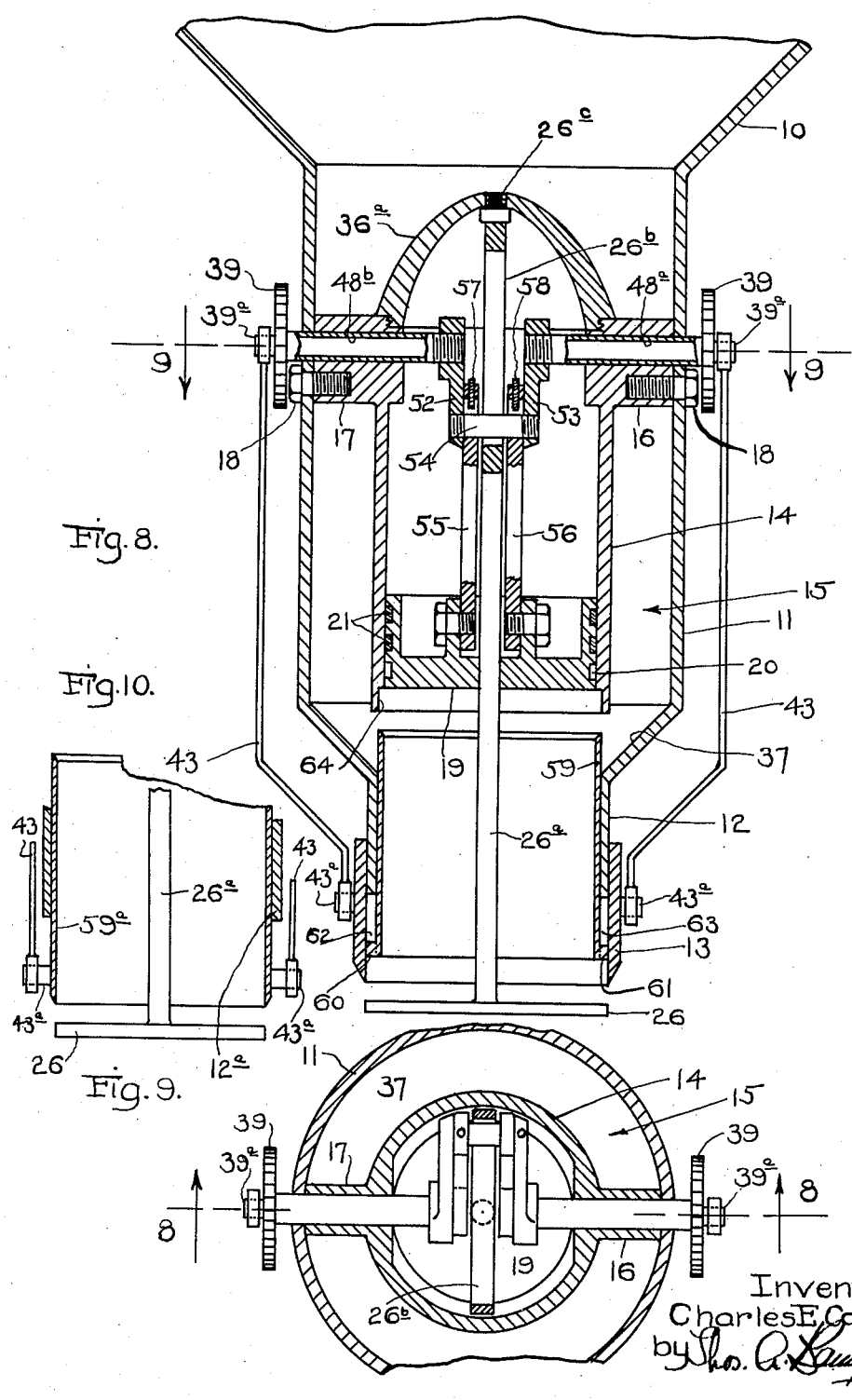

Oct. 24, 1939.  C. E. CARPENTER  2,176,989
DOUGH-BATCH CUTTER
Filed April 1, 1938   3 Sheets-Sheet 3
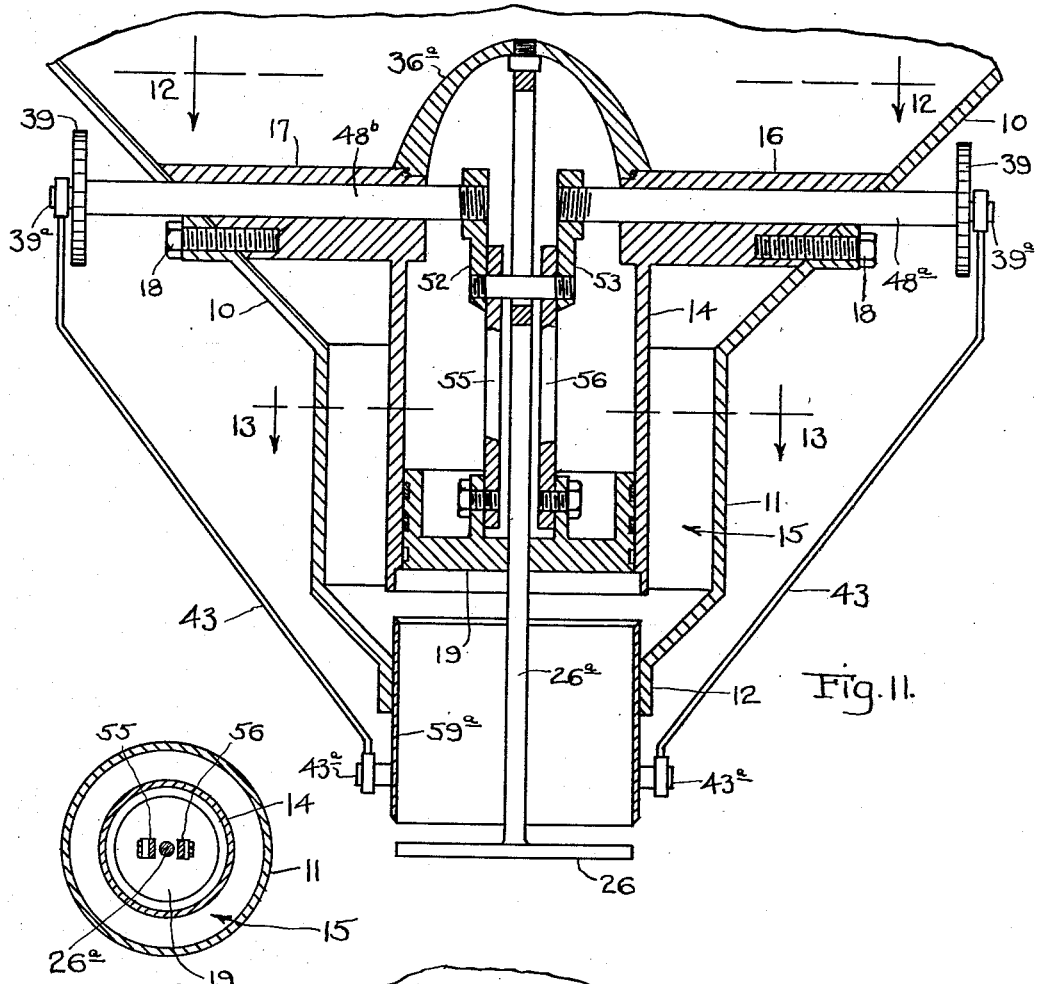
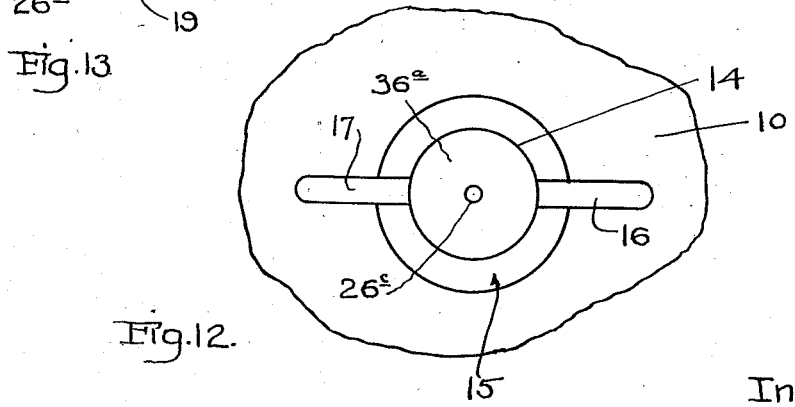
Inventor:
Charles E. Carpenter, Patented Oct. 24, 1939

2,176,989

UNITED STATES PATENT OFFICE 2,176,989

DOUGH-BATCH CUTTER

Charles E. Carpenter, Chicago, Ill.

Application April 1, 1938, Serial No. 199,487

19 Claims. (Cl. 107—14)

This invention relates to improvements in dough-batch cutters and the like, especially to such cutters intended for the cutting of doughnut batches. The present improvements relate to that general type of cutter which is disclosed and covered by my co-pending application for Letters Patent of the United States, Serial No. 82,111, filed May 27, 1936, and allowed October 22, 1937, which matured on May 17, 1938, into Patent No. 2,117,399. In that application there is disclosed a form of cutter in which there are provided two concentric cylindrical chambers or passages, one being a dough passage and the other being a piston cylinder with the piston therein, said chambers or passages being connected at one end so that upon operating the piston in its cylinder there is created alternately pressure and suction at the point of connection, whereby the dough from the hopper is drawn to said point on one stroke of the piston, and is discharged to the delivery throat on the other stroke of the piston. In the particular arrangement shown in that application the piston is located in the outside or encircling chamber or passage, the inner passage being the one through which the dough is moved to the throat.

In some cases it may be found desirable to reverse the arrangement from that particularly shown in the drawings of the aforesaid application, placing the piston in the central chamber or passage, and allowing the dough to move down through the outer or encircling chamber to the throat. Such an arrangement presents, in some cases, advantages of construction and operation, and is advantageous from other standpoints.

The main object of the present invention is to provide a dough batch cutter of the above-mentioned general type, in which the piston is located in the central passage or chamber, and in which the dough moves down through the outer or encircling passage or chamber, together with suitable and effective means to operate the piston as so located, and in proper relationship to the cut-off sleeve or valve at the position of the disk or die. In this connection it is a further object to so arrange the parts that the downwardly moving dough moves in a very direct path from the hopper to the delivery throat, and with little change of direction during such movement.

A further feature of the invention relates to an improved means for operating the piston and the cut off sleeve in proper timed relationship. In this connection it is an object to provide an arrangement in which these parts are operated from a single or common pin or stud, with the connections therefrom so made that the desired timing of the piston and sleeve movements is secured.

A further feature of the invention is to provide means whereby the piston strokes may be varied in extent, so as to vary the amount of dough fed at each operation. In this connection it is an object to so arrange the parts that such variation may be made with movements in which the piston is always brought to the same extreme of movement in one direction, generally the bottom or final delivery position, and with variations of the other limit of movement. The device is, however, so arranged that the adjustment may be made for ensuring the same limit of movement at either end of the stroke.

A further object of the invention is to provide an arrangement such that the tendency of dough to work up past the piston will be reduced or completely eliminated. This may be done by provision of an arrangement such that, if desired, an air pressure may be built up or created against the piston during the stroke so as to resist the movement of any dough up past the piston.

A further object of the invention is to provide an arrangement in which there are a very small number of obstructions to movement of the dough as it moves to the delivery throat. In this connection the present arrangement is one in which only a single obstruction must be passed by a given portion of dough in its movement, and such obstruction is made of a form to reduce such obstruction or interference to dough movement as much as possible.

A further object is to provide a construction which can be very easily taken apart to clean or replace the parts, and also one which can be easily manufactured from a small number of parts of simple form and low cost of manufacture.

Other objects and uses of the invention will appear from a detailed description of the invention, which consists in the features of construction, and combinations of parts hereinafter described and claimed.

In the drawings:

Figure 1 shows a vertical longitudinal section through a machine embodying the features of the present invention, being taken on the lines 1—1 of Figures 2 and 4 looking in the directions of the arrows;

Figure 2 shows a fragmentary section through the crank and connecting rod arrangement whereby the piston is operated, being taken on the line 2—2 of Figure 1 looking in the direction of the arrows, showing the piston at its lower limit of movement in full lines, and the crank and connecting rod at the extreme upper limit of movement by dotted lines;

Figure 3 shows a fragmentary section on the line 3—3 of Figure 1 looking in the direction of the arrows, showing the streamline form of the bracket which supports the inner chamber or passage, so as to reduce obstruction to the dough movement to a minimum;

Figure 4 shows more or less diagrammatically an outside elevation of the device, looking at the operating mechanism;

Figure 5 shows on enlarged scale the connecting head of the connecting rod whereby the rock shaft is rocked, and it shows the means whereby the amount of rocking may be adjusted so as to always bring the piston to the same limit of movement with a variation of movement in the other direction to thereby adjust the size of the dough batch delivered;

Figure 6 shows a fragmentary section through a modified form of device which is provided with fingers to obstruct or impede any back movement of the dough towards the hopper and away from the delivery throat;

Figure 7 shows a section on the line 7—7 of Figure 6, looking in the direction of the arrows;

Figure 8 shows a vertical longitudinal section through a modified form of device which is provided with a definite cut-off valve for preventing back movement of the dough towards the hopper during the delivering operation, and which modified form of device is also provided with a modified form of connecting rod arrangement from the shaft to the piston, so that a continuous rotary movement of the shaft may be used;

Figure 9 shows a horizontal section on the line 9—9 of Figure 8, but with the shaft turned through a quarter revolution so as to better show the manner in which the cranks clear the cylinder wall. Figure 8 may also be considered as a section on the line 8—8 of Figure 9 with the exception that the shaft has been turned a quarter turn, as just explained; and Figure 10 shows a fragmentary detail section through the lower end portion of a modified construction similar to that of Figures 8 and 9, but in which the same tubular member constitutes both the cut-off sleeve and the valve member, its lower end constituting the cut-off edge, and its upper end portion constituting the valve member.

Figure 11 shows a vertical section similar to that of Figures 1 and 8, but showing a modified arrangement in which the cylinder extends well up into the hopper and in which the lugs which support the cylinder are above the throat;

Figure 12 shows a horizontal section on the line 12—12 of Figure 11, but on smaller scale; and Figure 13 shows a horizontal section on the line 13—13 of Figure 11, but on smaller scale.

Referring first to Figures 1 to 5 inclusive, the machine therein illustrated is for production and delivery of doughnut batches from the lower end of a dough hopper 10 in which a suitable quantity of the dough is retained. The cylindrical passage or chamber 11 extends down from this hopper, and the lower portion thereof is contracted to provide the throat portion 12. Said throat portion is of the proper diameter according to the general needs of the machine. A cut-off sleeve or valve 13 is nicely mounted on the outside of this throat so that it may be moved up and down thereon, to cut off the dough batches and seal the delivery opening, according to well understood principles in this art. The lower end of this sleeve is accordingly preferably sharpened as indicated in Figure 1.

Within the passage 11, and separated therefrom is the cylindrical chamber 14, being of a size to leave the annular passage 15 through which the dough moves down from the hopper to the throat. This chamber 14 is provided in its upper portion with the outwardly projecting lugs 16 and 17 which come to the inner face of the passage 11 as shown in Figure 1. These lugs are preferably of streamlined cross-section as well shown in Figure 3, so that the downwardly moving dough is obstructed in its movement to only a small extent thereby. There may be as many of these lugs as desired, spaced around the machine, but generally two of them located at opposite positions will suffice, same also serving to receive the rock shaft presently to be described. These lugs are secured to the chamber 11 in suitable manner, as by means of the screws 18; and it will presently appear that the rock shaft itself also serves to hold the lugs against any rocking tendency, and thereby to keep the inner chamber 14 in perfect alignment with the outer chamber 11.

Within the cylindrical chamber 14 there is located the piston 19. The same may be reciprocated up and down so as to produce suction and pressure alternately at its bottom face. This piston may be provided with two or three encircling grooves such as 20, and I have shown piston rings 21 in two of these grooves, leaving the third or bottom one unoccupied by such piston ring. A ring 22 is secured to the lower end of the cylindrical chamber 14, as by being screwed thereto as shown; and this ring 22 has several arms 23 reaching inwards to the central hub 24, into which the downwardly extending rod 25 may be threaded. The lower end of this rod carries the die 26 which serves in conjunction with the sleeve 13 to perform the cutting of and perforating operations in well understood manner. It will be noted that with this construction the die 26 with its rod 25 may be inserted into place after the other parts have been assembled, and that it is not necessary that the throat should be as large as the cylindrical chamber 14. The outer edge of the die 26 should be of the same size as the sleeve 13 so that these parts will properly co-operate.

Extending across the cylinder 14 is the rock shaft 27. The same is shown of tubular form for a reason presently to be explained. Said rock shaft extends to the outside of the chamber 11 so that it can be operated from the outside of the machine; and it is seen that the rock shaft passes through the lugs 16 and 17 wherein its end portions are well journalled. The projecting portions of the rock shaft also journal in the cylinder or chamber 11, so that the lugs 16 and 17 are prevented from turning about a transverse axis, and the cylinders 11 and 14 are retained in alignment.

A split sleeve 28 is mounted on the central portion of the rock shaft, and secured by means of the bolt 29 (see Figure 2). The crank arms 30 and 31 are carried by this sleeve 28, and the crank pin 31a passes through them. The lugs 32 and 33 are provided on the top face of the piston 19, and the pin 34 passes through them. The connecting rod 35 extends between the pins 31a and 34; and said connecting rod is deformed as well shown in Figure 2, so that in rocking upwards there is no interference between the connecting rod and the rock shaft during a complete half stroke, that is, from bottom to top extreme. This fact is well shown by the dotted lines in Figure 2. Thus it is possible to perform complete half rocking movements of the rock shaft, with corresponding maximum movements of the piston up and down.

A cover or top 36 is provided for the cylinder 14. The same is conveniently threaded into place as shown, so that it can be readily removed or replaced from above, and without disturbance to the remaining parts of the machine. Thus it is possible to reach down into the cylinder to tighten or loosen the split sleeve 28. When same has been loosened, the rock shaft may be readily drawn out from the structure, and then the remaining parts may be readily disassembled. It is noted that the top face of this cover 36 is curved or so formed as to interfere as little as possible with the down flow of the dough from the hopper to the annular passage 15. It is also noted that during its down flow the dough moves in a very direct path of movement from the hopper to the delivery throat, and therefore suffers but little "kneading". In this connection, it is also noted that there is but a single position of interference with the direct dough travel, namely at the location of the lugs 16 and 17, which are of themselves well formed to reduce such interference to a minimum.

As the piston is drawn up by proper rocking of the shaft 27, suction is created at the lower face of the piston, and, assuming that the sleeve 13 is in lowered position to seal the delivery opening, dough will be drawn down from the hopper along the passage 15. Thereafter, assuming that the sleeve 13 has now been raised to open the annular passage, downward movement of the piston will tend to force the dough out towards the throat and through the delivery orifice or opening. It is noted that the shoulder 37 at the joinder of the cylindrical chamber 11 with the throat 12, will greatly obstruct any back movement of the dough under pressure of the piston, towards the hopper, but will not materially interfere with the normal movement of the dough downwards from the hopper towards the throat, so that when the piston is forced down to create pressure on the dough, the tendency is for the dough to move directly to the throat 12, for delivery therefrom. Furthermore the distance from the lower end of the piston (when at its lower extreme of movement), to the throat delivery is much less than the distance backwardly to the hopper, so that this also will ensure proper delivery of the dough to the throat, instead of mere back movement of the dough towards the hopper. Thus it appears that a proper unidirectional flow of the dough is ensured without the need of valve means to prevent back movement of the dough to the hopper, but such valve means may, of course be provided if desired. In the modified form shown in Figures 6 and 7 I have shown a series of fingers 38 secured to, and projecting down from the ring 22. These fingers are of light springy metal such as steel, and are slightly curved as shown in Figure 7, with their concavity towards the center of the passage. It is found that such fingers, so concave towards the center, will have considerable resistance to outward flexing, such as would be needed to permit of a back movement of the dough, but will readily flex inwardly towards the center of the passage, to allow the dough to flow towards the delivery throat. Such an arrangement, therefore, constitutes means tending to obstruct the back flow of the dough towards the hopper when the pressure is created.

Any suitable means may be provided for rocking the shaft 27 back and forth in timed relationship with respect to the sleeve movements 13. In the arrangement shown I have provided a pinion 39 on each end of the rock shaft and secured thereto, and beyond each such pinion there is loosely mounted the sprocket 40 on each end of the rock shaft. A large gear 41 is journalled to the cylindrical chamber 11 in mesh with each of the pinions 39, so that a given angular rocking movement of such gear will result in a multiplied amount of angular movement of the pinion, and therefore of the rock shaft. A stud 42 on each sprocket is connected with the sleeve 13 by a link 43, so that as the sprocket rotates the sleeve is moved up and down. Another link 44 connects each stud 42 with the corresponding large gear 41, so that as the sprocket performs each complete revolution the large gear is rocked back and forth, and accordingly the pinion 39 and rock shaft 27 are also thereby rocked back and forth. The link 44 effects its connection to the large gear by means of a stud 45 on said gear, and a head 46 is threaded to the end of the link so that it can be set back and forth thereon. Said head 46 is slotted, so that by turning it around the extent of projection of the end of the link 44 into the slot will be adjusted as shown by the dotted lines in Figure 5; and also there is a screw 47 threaded into the other end of the slotted head so that the extent of its projection into the slot may also be adjusted as shown by the dotted lines in Figure 5. The result is that an adjustable amount of lost motion may be secured in the engagements of the link elements with the stud 45, and thus the degree of rocking of the large gear may be adjusted; and furthermore, the arrangement is such that the piston may be caused to always come to the same limit of movement in either direction as selected, and irrespective of the amount of piston movement accomplished.

It will also be noted that the link 44 operates substantially on quartering movement with respect to the movements of the link 43. Thus the sleeve 13 and the piston are caused to move in proper timed relationship, and by the use of a single operating element, namely the stud 42. Also, that the sleeve 13 always makes its full stroke movements, notwithstanding the adjustability of the strokes of movement of the piston.

It will be noted that during the upward movement of the piston there is a compressing action of the air trapped above the piston by head 36. In some cases I prefer to provide the openings 48 in the hollow rock shaft 27, so that the air can flow in and out of the space above the piston according to the up and down piston movements, thereby relieving any such compressing action. In other cases it may be found desirable to close either the holes 48, or the ends of the rock shaft, and thereby trap the air within the space above the piston. When this is done there will be built up a pressure against the top face of the piston during the upward piston movement, which will act to resist any tendency of the dough to work up between the piston and the cylinder wall. Such closure of the hollow rock shaft may be readily accomplished by suitable plugs inserted into the ends of the rock shaft from the outside of the machine.

In order to drive the sprockets at the two sides of the machine in harmony, I have shown the cross shaft 49 extending across the machine, and provided at each end with a sprocket 50 connected to the corresponding sprocket 40 by the chain 51. The shaft 49 may be driven in any convenient manner, either by hand or motor.

In the embodiment of the invention shown in Figures 8 and 9 the shaft 49 is divided into the two sections 49ᵃ and 49ᵇ, so that the cranks 52 and 53 may be connected thereto as by threading, as shown in Figure 8. A crank pin 54 may be threaded into both of these cranks. In order to eliminate the need of the ring 22 with the radial arms 23 and hub 24 to support the stem 25 for the die 26, I have, in the arrangement of Figures 8 and 9 carried said stem 26a up through the piston 19 and between the cranks 52 and 53; and in order to avoid interference between the said stem 26a and the shaft and the cranks, I have provided the stem with a split or bifurcated portion 26b, preferably of circular form, and joining again at the top of the cylinder where it is provided with the threaded extension 26c which is threaded into the cylinder head 36a.

The cranks 52 and 53 are connected to the piston by means of the connecting rods 55 and 56 which engage the crank pin 54, said connecting rods working at the sides of the stem 26a. Each of these connecting rods is provided with a slot in its upper end portion, and which receives the crank pin 54, so that a given maximum amount of lost motion may be produced therein, with a corresponding reduction of piston movement; but it will be noted that in all cases the piston will always be moved to the same lower limit of movement, since the crank pin will always engage the bottom of the slots. I have provided the adjustable screws 57 and 58 through the ends of the connecting rods, and reaching into the slots aforesaid, so that by threading these screws in or out to a greater or less extent, I am able to adjust the extent to which the rotation of the crank pin will raise the piston on the up stroke. Thus, by threading these screws down so as to take up the entire amount of the lost motion, I am able to cause a full up travel of the piston, equal to the full crank throw, and thus draw in the maximum amount of dough, whereas, by readjusting the screws so as to permit more or less lost motion, I can correspondingly reduce the extent to which the piston will be raised, with corresponding reduction of the amount of dough which will be drawn in.

There is a valve sleeve 59 working nicely in the interior of the throat 12; and the lower portion of this valve sleeve 59 is connected to the cut off sleeve 13 by means of a pair of lugs 60 and 61, so that the sleeve 59 will travel up and down in harmony with the sleeve 13. In fact these two constitute in a sense a single element or member. It is noted that the throat 12 is provided with the upwardly reaching notches 62 and 63 to receive the lugs 60 and 61 and permit such movement; but the said lugs do not come down low enough to interfere with the die 26, even while allowing the cutting edge of the sleeve 13 to travel past said die and perform its cutting function properly.

On the up stroke of the sleeve 13 (thereby also raising the sleeve 59), said sleeve 59 comes to seal with the lower portion of the cylinder 14 so as to completely seal off the throat and piston from the passage 15 which supplies the dough from the hopper. In fact, it is seen that the lower edge portion of the cylinder 14 has the circular recess 64 to receive the upper edge portion of the sleeve 59, and said upper edge portion is also preferably bevelled as shown so that a close engagement with the lower portion of the cylinder will be ensured, and so as to avoid any packing of the dough against the lower portion of the cylinder.

The shaft sections 48a and 48b are provided with the gears 39 which carry the studs 39a, and said studs 39a are connected to the sleeve 13 by the links 43, as in the form of Figures 1 to 7 inclusive, and said studs are so placed as to secure quartering movements of the sleeve 13 (and therefore, also of the sleeve 59), with respect to the piston movements. Thus it follows that, with shaft rotation in the proper direction, the sleeve 59 will close the lower end of the passage 15 and the sleeve 13 will open the annular delivery orifice during the downward movement of the piston; and the sleeve 59 will open the lower end of the passage 15, and the sleeve 13 will close the annular delivery orifice during the upward movement of the piston. In this manner a perfect valving action is secured, and backward movement of the dough on the downward movement of the piston is secured. It is noted that the structure for accomplishing this result is extremely simple and positive in action, easily manufactured, and readily assembled or adjusted.

It will also be noted that the bearing of the rod or stem 26a against the piston at the point where it passes through the piston will operate in conjunction with the support of the upper end of said stem to provide a very stiff support for the stem, notwithstanding the length of the stem, so that the die 26 will be held securely in proper alignment.

While I have herein shown and described only certain embodiments of the features of my invention, still I do not intend to limit myself thereto, except as I may do so in the claims to follow.

It will be noted that the cut-off sleeve 13 of the arrangement of Figures 8 and 9 is directly connected to the valve sleeve 59 of said figures by means of the lugs 60 and 61, and that said sleeve and valve member rise and fall together and are actuated by means of the links 43. The sleeve 13 is of greater diameter than that of the sleeve 59 due to the fact that the die member 26 is larger than the cylinder 14, (the interior of the cylinder being of the same diameter as that of the sleeve, so that, if desired the piston can ride down into the sleeve 59).

In the modified arrangement shown in Figure 10 the die 26 is the same diameter as the piston 19, and a single sleeve 59a is used for both the cut-off function and the valving function, said sleeve being carried down to a point where its lower edge may perform the cutting off function, and its upper edge being carried up to a point where it may seal against the cylinder 14. In this case the studs 43a by which the links 43 are connected to the cut-off sleeve are carried directly to the sleeve 59a and they work below the lower edge of the throat 12a at all times. By this arrangement, also there is produced a structure in which the cut-off sleeve works in the interior of the throat, instead of on the exterior thereof, as in previous arrangements, so that the sealing action is against the inner surface of the throat. If the sleeve 59a should be terminated at its upper edge at a point such that said edge would not work up to the cylinder, there would be produced an arrangement in which the cut-off sleeve was inside of the throat, but without any valving action across the lower portion of the passageway 15, whereas in the arrangement shown in Figure 10 the sleeve performs both the cutting-off function and the valving function, a very desirable arrangement.

In the modified arrangement of Figures 11, 12 and 13, the cylinder 14 has been set well up in the structure so that its head is within the hopper 10, and by so doing I have been enabled to bring the lugs 16 and 17 so high up that they are above the throat 12, thereby leaving the throat proper entirely unobstructed by any cross members, and thus also leaving the passage 15 completely unobstructed around the entire circle. Thus the down flowing dough which has passed the lugs 16 and 17 is enabled to again completely join into a continuous mass encircling the cylinder, and this condition is obtained throughout the entire height of the throat itself. As a consequence the dough delivered to the point of cut-off is a completely homogenous mass, and completely circular, so that the doughnut when cut off will be perfectly homogenous around its entire circle.

The arrangement of Figures 11, 12 and 13 also embodies the arrangement of cut-off sleeve shown in Figure 10, that is, in which the same sleeve serves both for cut off purposes by co-operation with the die 26, and also serves to act as the valve whereby the lower end of the passage 15 is controlled.

It will also be seen that with this form of structure the entire mechanism may be withdrawn upwardly through the hopper when the shaft sections have been unscrewed from the crank arms 52 and 53, and when the lower ends of the links 43 have been disconnected from the pins which connect them to the sleeve.

I claim:

1. Means for feeding batches of dough comprising in combination a fixed cylinder, together with an element forming an annular passageway around said cylinder, a throat in alignment with said cylinder and communicating with both the lower end of the cylinder and the lower end of the passageway, said passageway being of constant size around the cylinder for a substantial distance immediately in advance of the throat, a piston working in the cylinder, a cut off sleeve at the lower end of the throat, and means to reciprocate the piston and the cut off sleeve in timed relationship, substantially as described.

2. Means for feeding batches of dough comprising in combination a fixed cylinder, together with an element forming an annular passageway around said cylinder, a throat in conjunction with the lower end portion of the passageway, a piston working in the cylinder, valve means in connection with the throat, and means to reciprocate the piston and operate the valve means in timed relationship, substantially as described.

3. Means for feeding batches of dough comprising in combination a fixed cylinder, a piston working therein, together with an element forming an annular passageway around said cylinder, a throat in conjunction with the lower portion of the passageway, and means to reciprocate the piston within the cylinder, said means including means adjustable to permit variation of the extent of reciprocation with a fixed limit of movement always in one direction, substantially as described.

4. Means for feeding batches of dough comprising in combination a fixed cylinder, a piston therein, together with an element forming an annular passageway around said cylinder, a throat in conjunction with the lower portion of the passageway, and means to reciprocate the piston, said means including means for adjustment of extent of such reciprocation, and for adjustment of the limit of travel in either direction of movement of the piston, substantially as described.

5. Means for feeding batches of dough comprising in combination a fixed cylinder, a piston working therein, together with an element forming an annular passageway around said cylinder, a throat in conjunction with the lower portion of the passageway, means within the cylinder to reciprocate the piston, supporting means extending between the cylinder and the element aforesaid, and means extending through the supporting means operative effectively to operate the reciprocating means, substantially as described.

6. Means for feeding batches of dough comprising in combination a cylinder, a piston therein, together with an element forming an annular passageway around the cylinder, a throat in conjunction with the lower portion of the passageway, means extending between the cylinder and the element aforesaid to support the cylinder, a rock shaft extending through said supporting means from a point external to the passageway to a point within the cylinder, crank means within the cylinder connecting said rock shaft with the piston, and means external to the device to operate the rock shaft with a selected extent of rocking movement, substantially as described.

7. Means for feeding batches of dough comprising in combination a cylinder, a piston therein, together with an element forming an annular passageway around the cylinder, a throat in conjunction with the lower portion of the passageway, means extending between the cylinder and the element aforesaid to support the cylinder, a rock shaft extending through said supporting means from a point external to the device to a point within the cylinder, crank means within the cylinder connecting said rock shaft with the piston, a cut off sleeve in conjunction with the throat, and means external to the device for rocking the shaft and operating the cut off sleeve in timed relationship, substantially as described.

8. Means for feeding batches of dough comprising in combination a cylinder having a top closure slanting downwardly, a piston in said cylinder, an element forming an annular passageway around said cylinder and providing a passageway from a point adjacent to said slanting top to a point below the cylinder, a throat in conjunction with the lower portion of the passageway, means extending across the annular passageway between the cylinder and said element to support the cylinder in position, said means being of streamlined contour, and means to reciprocate the piston within the cylinder, substantially as described.

9. Means for feeding batches of dough comprising in combination a cylinder, an element forming an annular passageway around said cylinder and providing a passageway, a throat in conjunction with the lower portion of the passageway, a cut off sleeve in conjunction with said throat, a piston in the cylinder, a rock shaft extending from a point in the cylinder to a point external to the element aforesaid, a rotating stud, and connections from said stud to both the sleeve and the rock shaft, said connections being substantially ninety degrees apart, substantially as described.

10. Means for feeding batches of dough comprising in combination a cylinder, a piston therein, an element forming an annular passageway around the cylinder, a throat in conjunction with the lower portion of said passageway, a cut off sleeve in conjunction with said throat, a rock shaft extending from a point external to the element aforesaid to a point within the cylinder, connections therefrom to the piston, a rotating stud, and link connections from said stud to the rock shaft and to the cut off sleeve, said connections ninety degrees apart, substantially as described.

11. Means for feeding batches of dough comprising in combination a cylinder and an element forming a passageway, said parts being concentric with each other, a piston within the cylinder, a throat in conjunction with the lower portion of the passageway, a cut off sleeve in conjunction with the throat, a rock shaft, connections between the rock shaft and the piston effectively to operate the piston with shaft rocking movements, a rotating stud, and connections between the stud and the rock shaft and between the stud and the sleeve, said connections being substantially ninety degrees apart, substantially as described.

12. Means for feeding batches of dough from a hopper, comprising in combination a fixed circular cylinder beneath the hopper and having its lower end open, a piston working in the cylinder, an element establishing a circular annular passageway from the hopper downwardly around the cylinder to the lower end thereof, means to support the cylinder from the element aforesaid, a throat extending downwardly from the lower portion of the annular passageway, said passageway being of constant size around the cylinder for a substantial distance immediately in advance of the throat, means within the cylinder to reciprocate the piston, means external to the element for actuating said reciprocation means, and means in conjunction with the throat to cut off the dough batches at that point, substantially as described.

13. Means for feeding batches of dough from a hopper, comprising in combination a fixed circular cylinder located beneath and in alignment with the hopper, said cylinder being open at its lower end, an element of circular form surrounding said cylinder, and spaced therefrom to establish an annular passageway between the cylinder and said element, said passageway reaching from the hopper to a position beneath the cylinder, a throat beneath and in alignment with the cylinder, and communicating with said annular passageway, said passageway being of constant size around the cylinder for a substantial distance immediately in advance of the throat, a piston working within the cylinder, means to support the cylinder from said element, and means to reciprocate the piston whereby a substantially completely encircling passageway is established from the lower portion of the hopper downwardly past the cylinder to the throat, for direct and substantially unobstructed movement of dough from the hopper to the throat, substantially as described.

14. Means for feeding batches of dough comprising in combination a cylinder, a piston therein, an element providing an annular passageway surrounding the cylinder and extending from a dough supply hopper downwardly to a position beneath the cylinder, a throat in connection with the lower portion of said passageway, a cut-off sleeve in conjunction with the throat, means to reciprocate the piston, valve means operative between the lower portion of the passageway and the throat, and an operative connection between the cut-off sleeve and the valve means effective to close the one and open the other simultaneously, substantially as described.

15. Means for feeding batches of dough comprising in combination a cylinder, a piston therein, an element providing an annular passageway surrounding the cylinder and extending from a dough hopper downwardly to a position beneath the cylinder, a throat in connection with the lower portion of said passageway, a cut-off sleeve in conjunction with the throat, means to reciprocate the piston, valve means operative between the lower portion of the passageway and the throat, and means to operate the valve means for opening and closing movements in proper timing with respect to the piston movements, substantially as described.

16. Means to form and feed dough batches, comprising in combination a cylinder, an element surrounding said cylinder and providing in conjunction therewith an annular passageway extending downwardly past the cylinder for flow of dough therethrough, delivery means in conjunction with the lower portion of said passageway, means to reciprocate the piston within the cylinder, valve means between the passageway and the delivery means, and means to operate said valve means in proper timing with respect to the piston movements, substantially as described.

17. Means to form and feed dough batches, comprising in combination a cylinder, an element surrounding said cylinder and providing in conjunction therewith an annular passageway extending downwardly past the cylinder for flow of dough therethrough, delivery means in conjunction with the lower portion of said passageway, means to reciprocate the piston within the cylinder, valve means between the lower portion of the passageway and the lower portion of the cylinder, and means to operate said valve means positively in proper timing with respect to the piston movements, effectively to establish communication between the passageway and the cylinder during upward piston movements and to discontinue such communication during downward piston movements, substantially as described.

18. Means to form and feed dough batches, comprising in combination a throat, an element providing an annular passageway communicating with the upper end of the throat, a cut-off die in alignment with the lower end of the throat, a single sleeve working in the throat, and having its lower edge adapted to co-operate with the die to cut off dough batches, and having its upper portion adapted to work across the passageway to valve the same, together with means to periodically advance dough downwardly through the throat and means to reciprocate the sleeve to alternately cut off the dough batches and valve the passageway, substantially as described.

19. Means to form and feed dough batches, comprising in combination a throat, an element forming a passageway communicating with the upper portion of the throat for delivery of dough to the throat, a die beneath the lower end of the throat, and a single sleeve element working in the throat, and having its lower edge adapted to co-operate with the die to cut off dough batches, and its upper portion adapted to work across the passageway to close the same, together with means to periodically advance dough downwardly through the throat, and means to reciprocate the sleeve to alternately cut-off dough batches and close the passageway, substantially as described.

CHARLES E. CARPENTER.